United States Patent

Swanson et al.

[15] 3,689,849

[45] Sept. 5, 1972

[54] SIGNAL GENERATOR

[72] Inventors: Elston H. Swanson, Locust Valley; James D Fahnestock; William H. Wicks, both of Huntington, all of N.Y.

[73] Assignee: Instruments for Industry, Inc., Farmingdale, N.Y.

[22] Filed: July 21, 1971

[21] Appl. No.: 164,652

[52] U.S. Cl. ........................331/1 A, 331/16, 331/68

[51] Int. Cl. ..............................................H03b 3/04

[58] Field of Search ...........................331/1 A, 16, 68

[56] References Cited

UNITED STATES PATENTS 3,364,439 1/1968 Cohen et al................331/1 A

*Primary Examiner*—John Kominski
*Attorney*—Allison C. Collard

[57] ABSTRACT

A signal generator whose output is selected and controlled by digital circuitry consisting of a frequency selector, a reference frequency generator for producing a stable fixed frequency, a multi-stage binary counter/divider connected to the output of the reference frequency generator, a counter connected to the output of the frequency selector and the reference frequency generator for producing the nine's compliment of the selected frequency, a multi-stage binary counter/register connected to the output of the counter, a multi-stage "AND" gate circuit coupled to the outputs of the counter/divider and the counter/register to permit selected "AND" gates to be enabled to produce a selected frequency, and a multi-stage digital/analog converter controlled by the counter/register. The analog voltage thus produced is combined with a correction voltage derived from a digital/analog converter controlled by a reversing counter which compares the selected frequency with the output frequency. The combination of voltages is servoed to that voltage that minimizes the difference between the selected frequency and the output frequency on a cycle-for-cycle basis.

9 Claims, 6 Drawing Figures

INVENTORS.
Elston H. Swanson
James D. Fahnestock
BY William H. Wicks
ATTORNEY

INVENTORS.
ELSTON H. SWANSON
JAMES D. FAHNESTOCK
WILLIAM H. WICKS
BY

ATTORNEY

INVENTORS.
ELSTON H. SWANSON
JAMES D. FAHNESTOCK
WILLIAM H. WICKS
BY
ATTORNEY.

INVENTORS.
ELSTON H. SWANSON
JAMES D. FAHNESTOCK
WILLIAM H. WICKS
BY [signature]
ATTORNEY.

SIGNAL GENERATOR

This invention relates to a signal generator whose output frequency is selected and controlled by digital circuitry.

More specifically, this invention relates to a signal generator capable of generating sinusoidal signals over a wide frequency range from a stable oscillator utilizing digital circuitry in combination with a broad band voltage controlled oscillator.

Conventional signal generators which are generally utilized as laboratory test equipment are capable of producing a wide range of frequencies by utilizing a tunable, relatively stable oscillator. These conventional signal generators are normally provided with a tuning dial, and range selector, so that the user can select the desired frequency output over a broad frequency range. The inherent inaccuracies of the tuning dial allow the desired output frequency to be only approximated, so that a frequency counter or other more accurate frequency measuring device is required to obtain the exact frequency. Moreover, in attempting to finally tune conventional generators, the user often has difficulty in adjusting the tuning dial to arrive at the desired frequency. Even after the desired frequency has been obtained, there is a tendency for this frequency to drift as a result of temperature changes, component aging and the like.

Recently, frequency synthesizers have been introduced to permit the digital setting of frequencies to avoid drift by using a reference oscillator coupled to a harmonic generator. Frequency synthesizers, however, have been found to have a limited frequency range and are expensive to manufacture and maintain.

Accordingly, the present invention provides an improved signal source or generator whose frequency is selected and controlled by a closed loop digital circuit. The signal generator of the invention utilizes digital circuits coupled to a voltage controlled sine wave oscillator. A 10-key decimal keyboard permits entry of the desired frequency into a digital register for the control and display. A numerical display readout provides an accurate visual indication and confirmation of the frequency selected. An additional feature of the invention permits its use as a frequency counter.

In the invention, a crystal controlled reference oscillator produces a stable reference frequency in the form of steep-sided pulses of a continuous frequency and constant period. The output of the reference frequency oscillator is coupled to a multiple stage binary counter/divider. In the binary counter/divider, for each pulse input of the reference oscillator, one and only one stage will be turning on at a given input pulse time. Pulses are derived from the binary counter/divider at the instant each stage switches from "off" to "on". An AND gate is connected to each of the binary counter/divider stages. The output of the AND gates are collected and combined in a multiple input "OR" gate which produces pulses at a frequency from zero to the reference oscillator frequency depending upon which AND gates are enabled.

Each of the "AND" gates enabled by means of a multiple stage binary counter/register which is loaded with a train of pulses from a decimal input register. The decimal input register also functions as a nine's complement preset counter. When the signal generator is activated, the reference frequency is gated into the preset counter, advancing its count in a binary coded decimal manner. When the count reaches all nine's, then a number of pulses equal to the digits of the selected frequency will have been counted which can be identified from the emergency of a carry pulse from the most significant digit of the preset counter. This carry pulse is used to disable a gate circuit so as to terminate the burst of pulses applied to the multi-stage binary counter/register, leaving the register set to the binary equivalent of the decimal number selected by the keyboard so as to control the multi-stage AND gates, and produce the selected frequency at the output of the "OR" gate.

The multi-stage binary counter/register also controls a digital-to-analog converter which produces at its output, an analog voltage that causes a voltage controlled oscillator ( VCO) to produce a frequency slightly higher than the desired frequency. This VCO frequency is then compared with the selected frequency at the output of the "OR" gate which is accurate, stable, and equal to the average of the selected frequency, but consists of pulses of a variable period. These two frequencies are compared in a multi-stage reversing counter. Since the frequency at the output of the voltage control oscillator exceeds the selected frequency, the count in the reversing counter will begin to increase causing a voltage to be produced at the output of a second digital-to-analog converter which is coupled to the counter. This voltage is proportional to the difference between the selected frequency and the output frequency of the voltage control oscillator. This voltage serves as a correction voltage and is coupled to an analog sealing circuit so as to produce a properly scaled voltage for the voltage control oscillator so the VCO output frequency will approach or balance against the selected frequency at the output of the "OR" gate. The time constants of the combining circuits and the feedback loop are adjusted to smooth out frequency excursions caused by the hunting of the frequency system as it seeks its equilibrium or null condition. The multistage reversing counter will seek an equilibrium count proportional to the difference between the frequency corresponding to that established by the first digital/analog converter and the selected frequency at the output of the "OR" gate. The reversing counter will correct for any drift or instability The output frequencies of the voltage control oscillator and thus the frequency at the output of the inventive frequency generator can be provided at multiple ( or submultiples) of the selected frequency by inserting scaling frequency dividers in the voltage control oscillator feedback path ( or in the digital reference path). By using scaling factors of the appropriate powers of 10, it is possible to select commonly used frequency units, such as Hz, KHz, and MHz. The voltage control oscillator is required to produce output frequencies over an extremely wide range of frequencies. This capability is difficult to achieve with a single oscillator circuit. In the invention, the voltage control oscillator consists of two separate oscillators; one which is crystal controlled and the other, voltage controlled. The output frequency of the invention is thus the difference between the crystal controlled and the voltage controlled frequencies. Both oscillators operate in the UHF region. It is the difference frequency which is compared with the frequency produced by the digital portion of the system. The frequency of the variable VCO is also controlled and is available as an auxiliary UHF output.

It is therefore an object according to the present invention to provide a digitally controlled signal generator capable of producing an output frequency which can be precisely and accurately selected.

It is another object according to the present invention to provide a digitally controlled sine wave oscillator which is easy to manufacture, reliable in operation, and accurate in use.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention. In the drawings, wherein similar reference characters denote similar elements throughout the several views.

Figure 1:
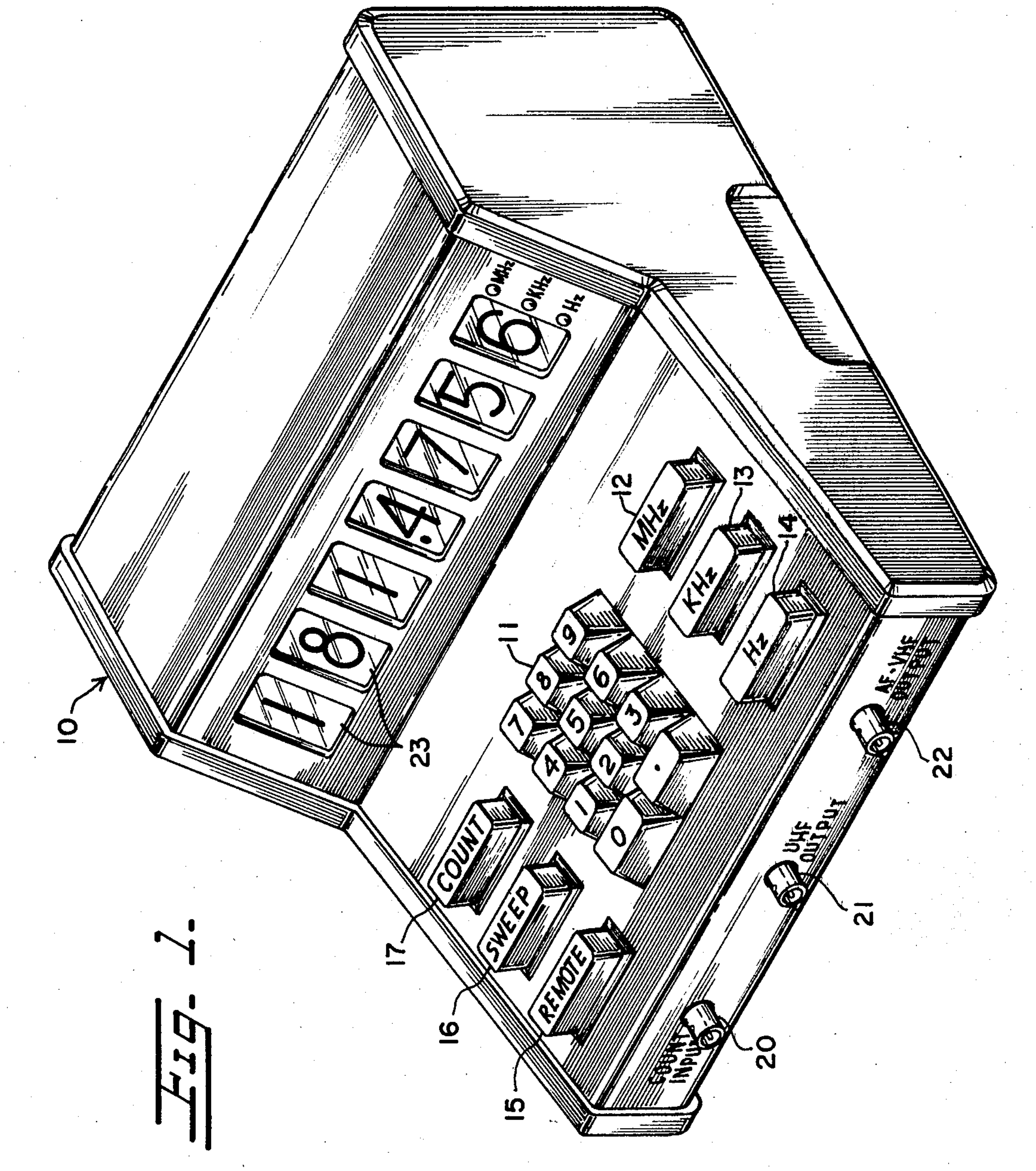
FIG. 1 is a perspective plan view of one embodiment of the digital signal generator of the present invention.

Referring to FIG. 1, there is shown the external features of the digital signal generator housed in a cabinet 10 having a digital keyboard 11 and frequency range selection buttons 12, 13 and 14. Function buttons 15, 16 and 17 are provided on the opposite side of keyboard 11. A digital readout 23 is formed along an inclined portion of the cabinet. On the right hand side of digital readout 23 is included three indicator lights 8 for indicating MHZ, KHZ AND HZ. On the front edge of the cabinet is provided a count input connector 20, a UHF output connector 21 and an audio frequency through VHF output 22. Cabinet 10 is designed to be light in weight and may be operated as a portable unit with rechargeable batteries.

Figure 2:
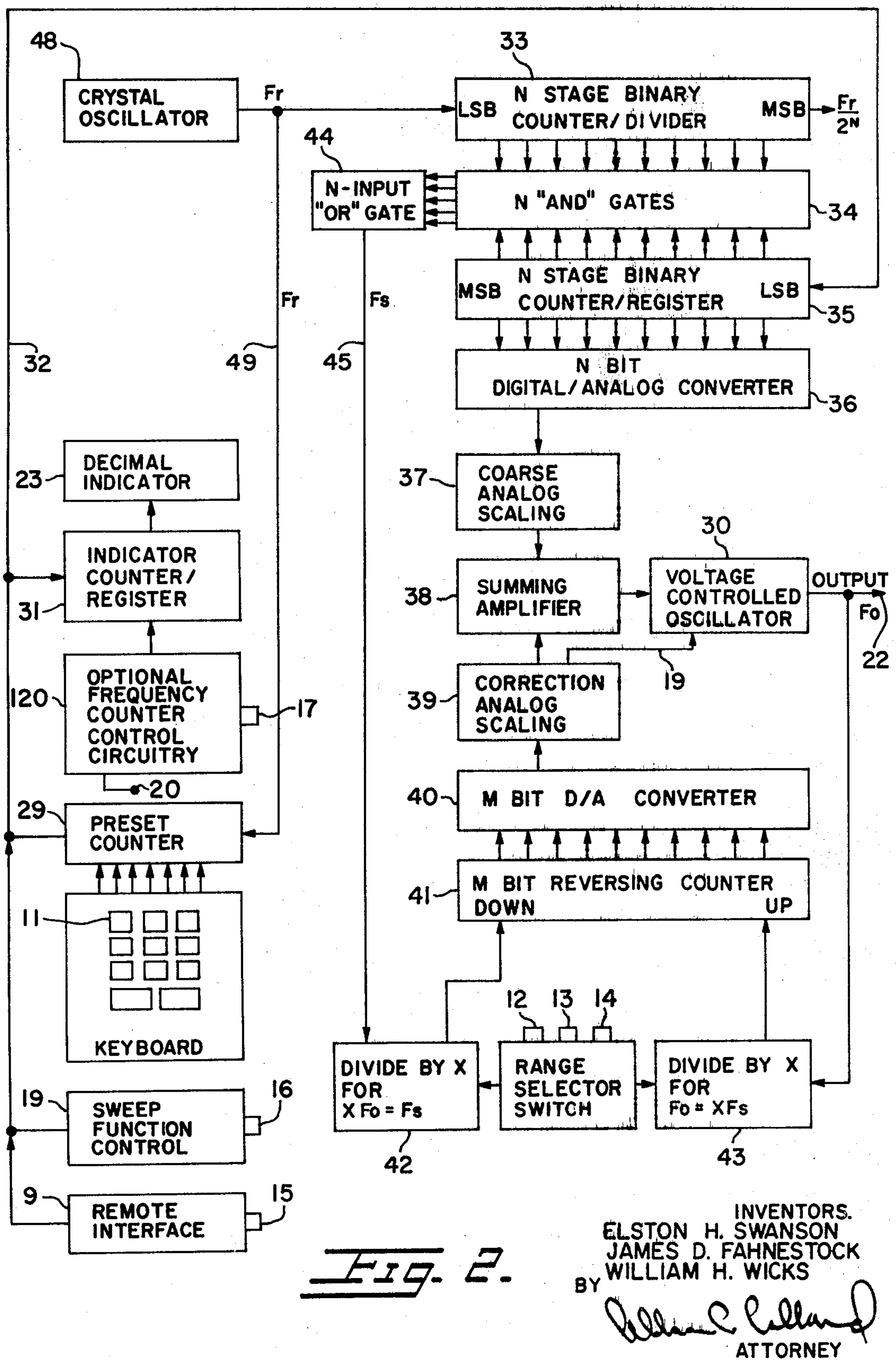
FIG. 2 is a schematic block diagram of the digital signal generator of FIG. 1.

FIG. 2 discloses a schematic block diagram for the preferred circuit of the digital signal generator. A crystal controlled reference oscillator 48 produces an output frequency $F_r$, which is coupled to an N stage binary counter/divider 33. The number of stages N for the system of FIG. 1 was selected as 14; however, fewer stages may also be provided to produce an instrument at lower cost. Each of the stages of binary counter/divider 33 is coupled into an "AND" gate represented by block 34. The other input of each "AND" gate is controlled by an N stage binary counter/register 35. The outputs of each "AND" gate in block 34 are coupled to an N-input "OR" gate 44, so that a pulse frequency $F_s$ is produced.

The N stage binary counter/register 35 is fed by line 32 from a preset counter 29. A digital keyboard 11 has its outputs coupled to the input of preset counter 29, so as to encode the counter with the nine's compliment of the selected number. When a frequency range selection button 12, 13, 14 id depressed, reference frequency $F_r$ is gated through line 49 into the input of preset counter 29, advancing its count in a binary-coded decimal manner. Binary counter/register 35 is thus loaded with a train of X pulses ( fewer than $2^N$) with the individual stages of counter/register 35 set or unset in a binary manner with the ON stages representing 1 ( one) and the OFF stages representing 0 ( zero). The stage at the input end of the chain will present the least significant bit $2^0$, and the $N$th stage representing tee most significant bit $2^{N-1}$. The ON stages of counter/register 55 are used to enable "AND" gates corresponding to opposite stages of counter/divider 33, and the average frequency $F_s$ will be equal to the binary number existing in counter/register 35 which is X, the number of pulses. Average frequency $F_s$ will retain the stability and absolute accuracy of crystal oscillator frequency $F_r$. The period of $F_s$ will be equal to $1/F_s$ on the average, but not constant as required in most conventional signal generators.

In preset counter 29, when the count starting with the nine's compliment of X reaches all nine's, then X pulses will have been counted. A carry pulse will then emerge from the most significant digit of preset counter 29. The carry pulse is used to disable the gate terminating the burst of X pulses at frequency $F_r$. This This burst of X pulses is thus fed through line 32 to counter/register 35 which establishes the binary equivalent of X. This equivalent was selected decimally, coded in nine's compliment, counted in binary-coded decimal form, and stored as a straight binary number to control the "AND" gates and average frequency $F_s$. Thus, the average frequency $F_s$ is equal to the number selected. An indicator counter/register 31 is also coupled to the output of preset counter 29 and feeds a decimal indicator 23 to provide indication of X, the selected frequency.

Figure 3:
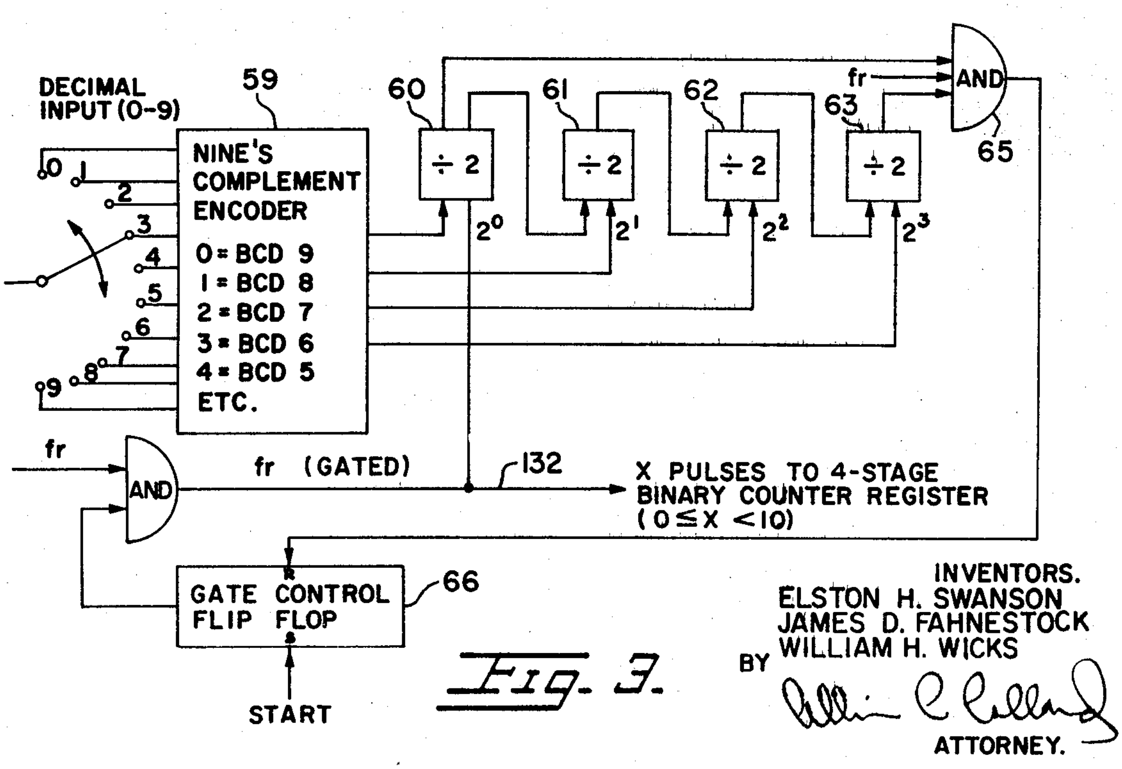
FIG. 3 is a schematic representation to illustrate one of the circuits of FIG. 2.

A simplified explanation of the operation of preset counter 29 can be described with respect to the circuit of FIG. 3. A decimal input is converted to a nine's compliment which is sent into a plurality of binary counters stages 60, 61, 62 and 63 which have their outputs connected to AND gate 65. For a decimal 3 input, for example, stages 61 and 62 are preset on binary 6. AND gate 65 detects the count produced by counters 60 and 63 ($2^0$and $2^3$) indicating binary 9 and resets gate control circuit 66 after three pulses emerge on line 132.

Figure 4:
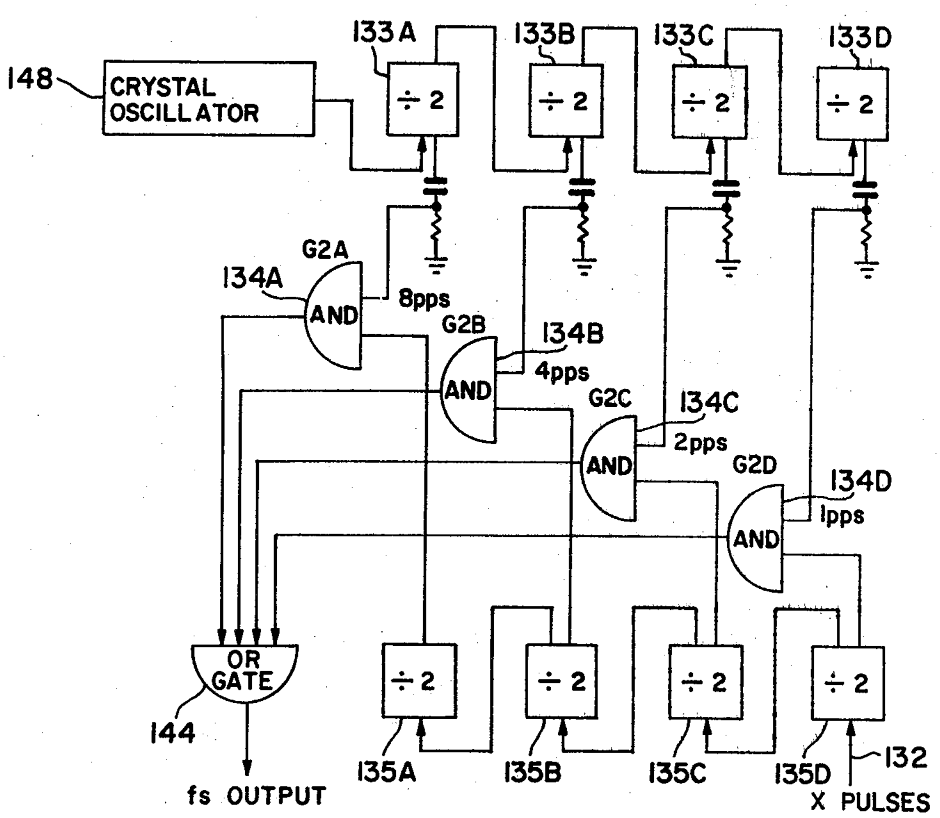
FIG 4 is another schematic illustration to illustrate a circuit of FIG. 2.

The operation of binary counter/divider 33, AND gates 34 and counter/register 35 is illustrated in a simplified form in the circuit of FIG. 4, where crystal oscillator 148 produces an output frequency $F_r$ of 16 Hz which is fed into a four-stage binary counter/divider 133A, 133B, 133C and 133D. The outputs of each of these dividers is coupled respectively to four AND gates 134A, 134B, 134C and 134D. A four-stage binary counter/register having individual stages 135D, 135C, 135B and 135A coupled into the other input of AND gates 134A–D. Each of the AND gates has its output coupled to a multiple input "OR" gate 144 which is similar to OR gate 44 of FIG. 2. Line 132 which feeds into the input of counter 135D is similar to line 32 so that when X pulses are fed into line 132, the output $F_s$ of "OR" gate 144 will equal X pulses per second.

Figure 5:
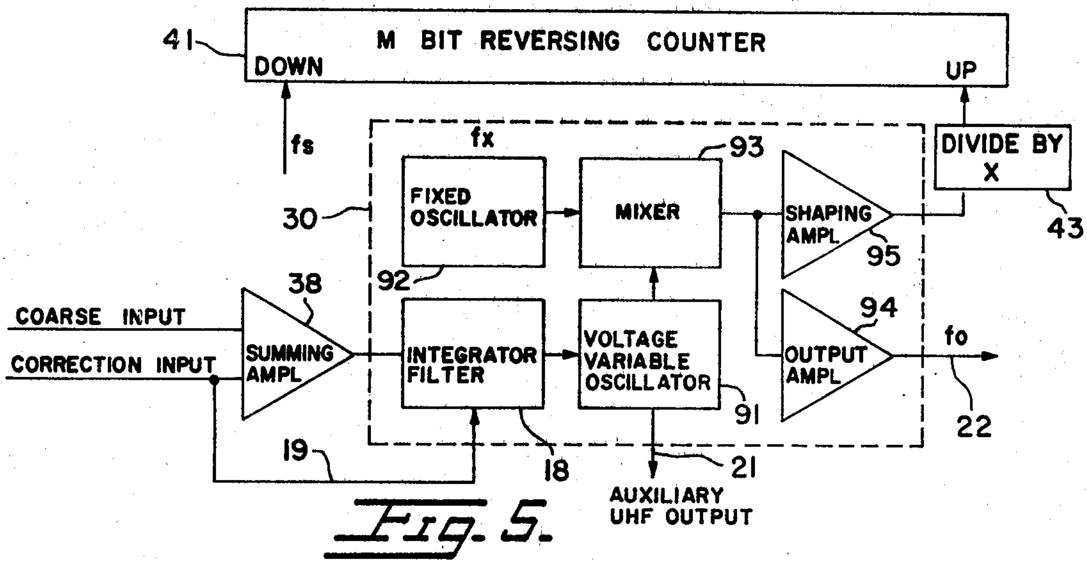
FIG. 5 is a detailed block diagram of the voltage controlled oscillator of FIG. 2.

Voltage control oscillator 30, as shown in detail in FIG. 5, consists of two UHF oscillators, a voltage variable oscillator 91 and a fixed controlled oscillator 92. The outputs of both oscillators feed into a mixer 93 which extracts the difference frequency from voltage variable oscillator 91 and fixed oscillator 92. Mixer 93 drives output amplifier 94 with a sine wave. Mixer 93 also drives shaping amplifier 95 to produce sharp pulses at $f_o$ to drive the "up" input of reversing counter 41. Reversing counter 41 thus compares $f_o$ with $f_s$. The number it registers at any instant reflects the difference between the two frequencies $f_s$ and $f_o$. This number is applied to a digital/analog converter 40 ( FIG 2), which produces a correction voltage proportional to this number, and therefore, proportional to this difference frequency. This correction voltage is scaled by correction analog scaling circuit 39, and combined with the voltage produced by coarse analog scaling circuit 37 from digital/analog converter 36, so as to cause voltage control oscillator 30 to change or correct its frequency to produce the desired output frequency at mixer 93.

In FIG. 5, integrator filter 18 is controlled by a sensing circuit which monitors on line 19, the correction input to summing amplifier 38, and gradually introduces an integrating action to the summing amplifier output as the magnitude of correction input voltage excursions subside, indicating the approach of a locked condition. Filter 18 is normally in the circuit and in operation. However, during the introduction of the locking phase, filter 18 is momentarily disabled. This action speeds up locking, and smoothes out the locked phase so as to reduce the time for locking $f_o$ to $f_s$.

Frequency range selection switcher 12, 13 and 14 serve two purposes. When depressed, they initiate the system cycle described above. In addition, they control decimal dividers or scalers 42 and 43 to scale $F_O$ or $F_S$ as required ( FIG. 2). For example, when $F_O$ is 100 MHZ, $F_S$ is 1 MHZ. Circuit 43 thus divides by 100 so that the "up" input to reversing counter 41 is at 1 MHZ, to match the "down" input of $F_S$. If $F_0$ is 10 KHZ, the scaling circuit 42 is adjusted to divide $F_S$ by 100 so the "down" input to reversing counter 41 matches the unscaled "up" input.

The frequency range selected by buttons 12, 13 and 14 also control the coarse analog scaling circuit 37 and correction analog scaling circuit 39. They also control the placement and effect of the decimal point of preset counter 29 and indicator counter/register 31.

In FIGS. 1 and 2, an unknown frequency can also be fed into connector 20 so that when button 17 is depressed, optional frequency counter control circuitry 120 is activated and the frequency can be read on digital indicators 23.

The signal generator can be caused to sweep up in frequency from frequency $F_x$, the frequency selected by the keyboard, by periodically advancing the content of the N stage binary counter/register 35 and the indicator counter/register 31.

In FIG. 2, sweep function control circuit 19 contains an oscillator whose output is coupled to registers 35 and 31 when sweep function button 16 is depressed. A more elaborate sweep function is obtained by presetting the desired lower frequency in registers 35 and 31, sensing the desired upper frequency registers 35 or 31, and causing repetitive sweeps between the two limits thus established. An advantage of this is that sweeping is absolutely linear, and if interrupted, the last frequency will be maintained with normal accuracy.

In FIGS. 1 and 2, when remote switch 15 is depressed, remote interface circuit 9 is enabled, allowing external control control of frequency and function selection. Remote interface circuit 9 includes serial and parallel conversion circuitry to replace inputs otherwise supplied by keyboard 11 and front panel push buttons 16 and 17.

Figure 6:
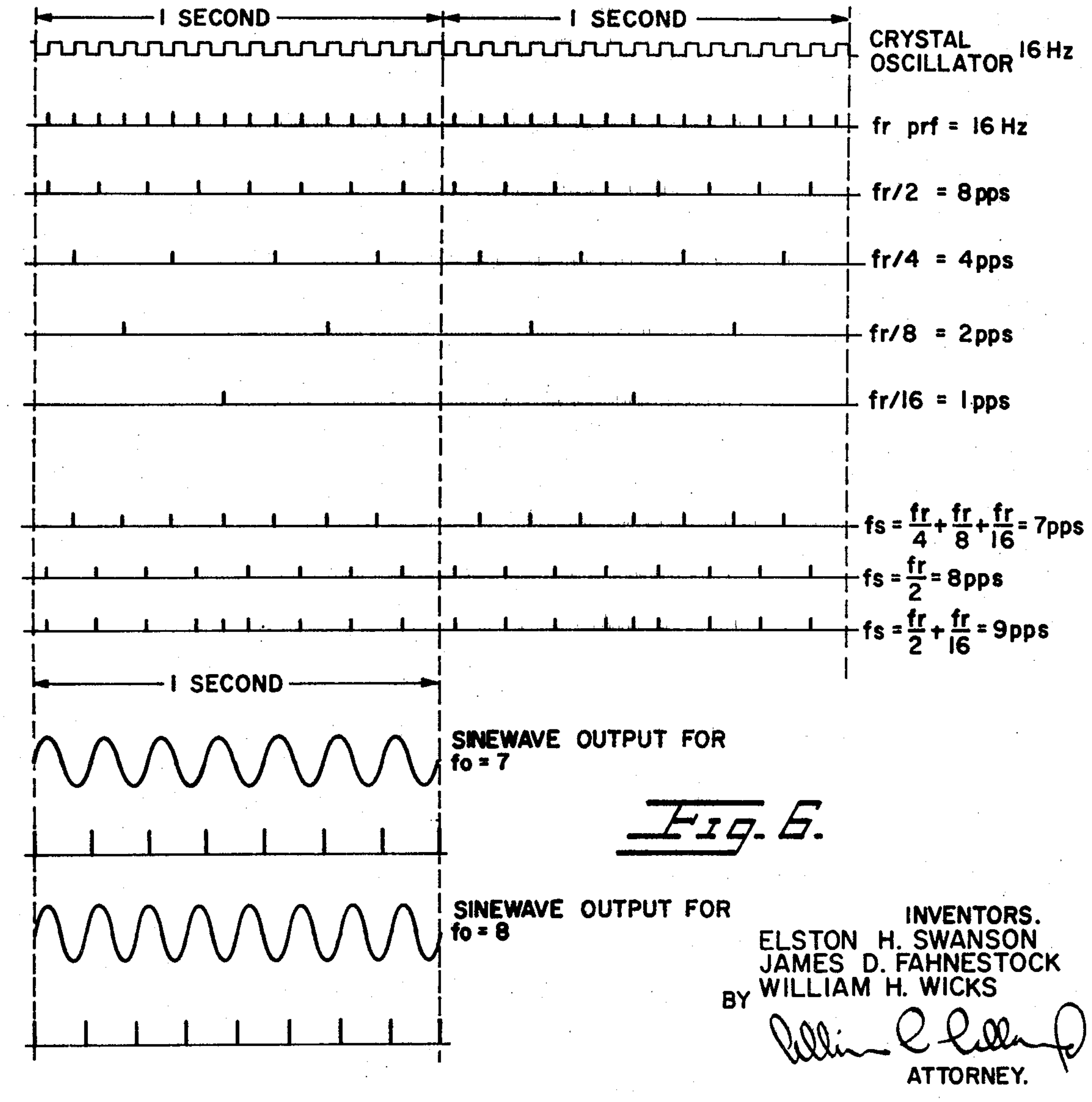
FIG. 6 discloses a plurality of wave forms at selected points in the circuit of FIG. 2.

FIG. 6 is a low frequency illustration of various waveforms utilized by the signal generator of the subject invention. With the crystal oscillator running at 16 Hz, frequency $f_r$ to divider 33 consists of short pulses at 16 Hz. For a simplified divider, where N equals 4, various $f_s$ combinations from divider 33 can be selected depending upon which "AND" gates 34 are enabled by register 35. For example, if gates 134B, 134C and 134D (in FIG. 4) are enabled, $f_s = f_r/4 + f_r/8 + f_r/16 = 7$ pps. If only gate 134A was enabled, $f_s = 8$ pps. If gates 134A and 134D were enabled, $f_s = 9$ pps.

What is claimed is:

1. A signal generator comprising;

frequency selector means, a reference frequency generator for producing a stable fixed frequency $F_R$, a multi-stage binary counter/divider connected to the output of said reference frequency generator, counter means connected to the output of said frequency selector means and said reference frequency generator for producing the nine's complement of the selected frequency, a multi-stage binary counter/register connected to the output of said counter means, a multi-stage "AND" gate circuit coupled to the outputs of said counter/divider and said counter/register to permit selected "AND" gates to be enabled to produce a selected frequency $F_s$, a multi-stage digital/analog converter connected to the output of said multi-stage binary counter-register, and means for combining the output of said digital/analog converter and a correction voltage derived from a cycle-by-cycle digital comparison of the output frequency and the selected frequency $F_s$ to produce the output frequency $F_o$ of the generator.

2. The signal generator as recited in claim 1, wherein said frequency selector means comprises a digital keyboard.

3. The signal generator as recited in claim 1, wherein said means for combining comprises a reversing counter having one input coupled to the selected frequency $F_s$ and its other input coupled to the output frequency $F_o$, a second digital/analog converter for producing a correction voltage proportional to the difference between the output frequency and the selected frequency, a summing amplifier for combining the output of said first and second digital/analog converters, and a voltage controlled oscillator coupled to the output of said summing amplifier for producing the output frequency proportional to the magnitude of the summing amplifier output.

4. The signal generator as recited in claim 3, wherein said voltage controlled oscillator comprises a fixed frequency oscillator, and a voltage variable oscillator having its input coupled to said summing amplifier, and a mixer connected to the outputs of both of said oscillators to produce the output frequency $F_o$ equal to the difference frequency between the fixed frequency and the voltage variable oscillators.

5. The signal generator as recited in claim 4, wherein said voltage controlled oscillator additionally comprises integrator means coupled to the output of said summing amplifier and an input of said summing amplifier to gradually integrate the output of said summing amplifier coupling to said voltage variable oscillator as the magnitude of the signal excursions on the input of said summing amplifier subside.

6. The signal generator as recited in claim 1 comprising an indicator counter/register coupled to the output of said counter means, and a decimal indicator connected to the output of said indicator counter/register for displaying the output frequency selected.

7. The signal generator as recited in claim 3 additionally comprising frequency range selection means, a first frequency divider coupled to the output of said range selection means and the selected frequency $F_s$ for dividing $F_s$ at one input of said reversing counter, and a second frequency divider coupled to the output of said range selection means and the output frequency $F_o$ for dividing $F_o$ at another input of said reversing counter.

8. The signal generator as recited in claim 6 additionally comprising an external input connection, and counter control circuitry coupled to said external input, and switch means for activating said control circuitry to permit external frequencies applied to said external input connection to be displayed on said decimal indicator.

9. The signal generator as recited in claim 1 additionally comprising a sweep function control oscillator and a switch for coupling said control oscillator to said multi-stage binary counter/register so that said oscillator will sweep between preselected upper and lower frequency limits.

* * * * *